United States Patent
Cazenave et al.

(10) Patent No.: US 10,301,036 B2
(45) Date of Patent: May 28, 2019

(54) SUSPENSION OF A TUBULAR ELEMENT IN AN AIRCRAFT COMPARTMENT

(71) Applicant: MICROTURBO, Toulouse (FR)

(72) Inventors: Olivier Cazenave, Pibrac (FR); Clement Lalanne, Toulouse (FR); Xavier Barneto, Toulouse (FR)

(73) Assignee: SAFRAN POWER UNITS, Toulouse (FR)

( * ) Notice: Subject to any disclaimer, the term of this patent is extended or adjusted under 35 U.S.C. 154(b) by 267 days.

(21) Appl. No.: 15/103,277

(22) PCT Filed: Dec. 8, 2014

(86) PCT No.: PCT/FR2014/053212
§ 371 (c)(1),
(2) Date: Jun. 9, 2016

(87) PCT Pub. No.: WO2015/092207
PCT Pub. Date: Jun. 25, 2015

(65) Prior Publication Data
US 2016/0311555 A1    Oct. 27, 2016

(30) Foreign Application Priority Data
Dec. 16, 2013   (FR) ...................................... 13 62729

(51) Int. Cl.
*G05D 1/12*        (2006.01)
*B64D 41/00*       (2006.01)
(Continued)

(52) U.S. Cl.
CPC ............. *B64D 41/00* (2013.01); *B64D 33/04* (2013.01); *B64D 33/08* (2013.01); *B64D 2041/002* (2013.01); *Y02T 50/44* (2013.01)

(58) Field of Classification Search
CPC ........ B64D 41/00; B64D 33/04; B64D 27/10; B64D 33/08; B64D 2041/002; B64D 27/26; B64D 2033/0213; Y02T 50/44
See application file for complete search history.

(56) References Cited

U.S. PATENT DOCUMENTS 4,079,981 A *   3/1978  Mahler ................. B64D 27/26
                                              244/54
6,328,293 B1 * 12/2001  Olsen .................. B60K 5/1241
                                              244/54

(Continued)

OTHER PUBLICATIONS

International Search Report with English Language Translation, dated Apr. 2, 2015, application No. PCT/FR2014/053212.

*Primary Examiner* — Assres H Woldemaryam
(74) *Attorney, Agent, or Firm* — Womble Bond Dickinson (US) LLP

(57) ABSTRACT

The invention relates to an assembly comprising a structure (2) and a tubular element (6), which is mounted isostatically in the structure (2), said tubular element (6) comprising a first end (7) connected to said structure by at least four connecting rods 10a-10b-10c-10d, thus setting four first degrees of freedom, and a second end (8) connected to said structure (2) by an attachment means (20) that sets two second degrees of freedom, said connecting rods comprising a means for adjusting the length thereof. In particular, it relates to an exhaust suitable for an auxiliary power unit in the compartment thereof and to the mounting method for aligning them.

6 Claims, 2 Drawing Sheets

(51) Int. Cl.
*B64D 33/04* (2006.01)
*B64D 33/08* (2006.01)

(56) References Cited

U.S. PATENT DOCUMENTS

| | | | | |
|---|---|---|---|---|
| 6,474,597 | B1* | 11/2002 | Cazenave | B64D 27/18 244/54 |
| 7,350,619 | B2* | 4/2008 | Williams | B64D 41/00 181/210 |
| 7,578,369 | B2* | 8/2009 | Francisco | F01D 25/30 181/213 |
| 2006/0060417 | A1* | 3/2006 | Williams | B64D 41/00 181/214 |
| 2006/0273221 | A1* | 12/2006 | Olsen | B64D 41/00 244/58 |
| 2010/0038471 | A1* | 2/2010 | Olsen | B64D 41/00 244/54 |
| 2011/0049291 | A1 | 3/2011 | Piezunka | |
| 2011/0259998 | A1 | 10/2011 | Sanz et al. | |
| 2012/0291450 | A1 | 11/2012 | DeDe et al. | |
| 2014/0311161 | A1* | 10/2014 | Bellabal | F01D 5/145 60/796 |

* cited by examiner

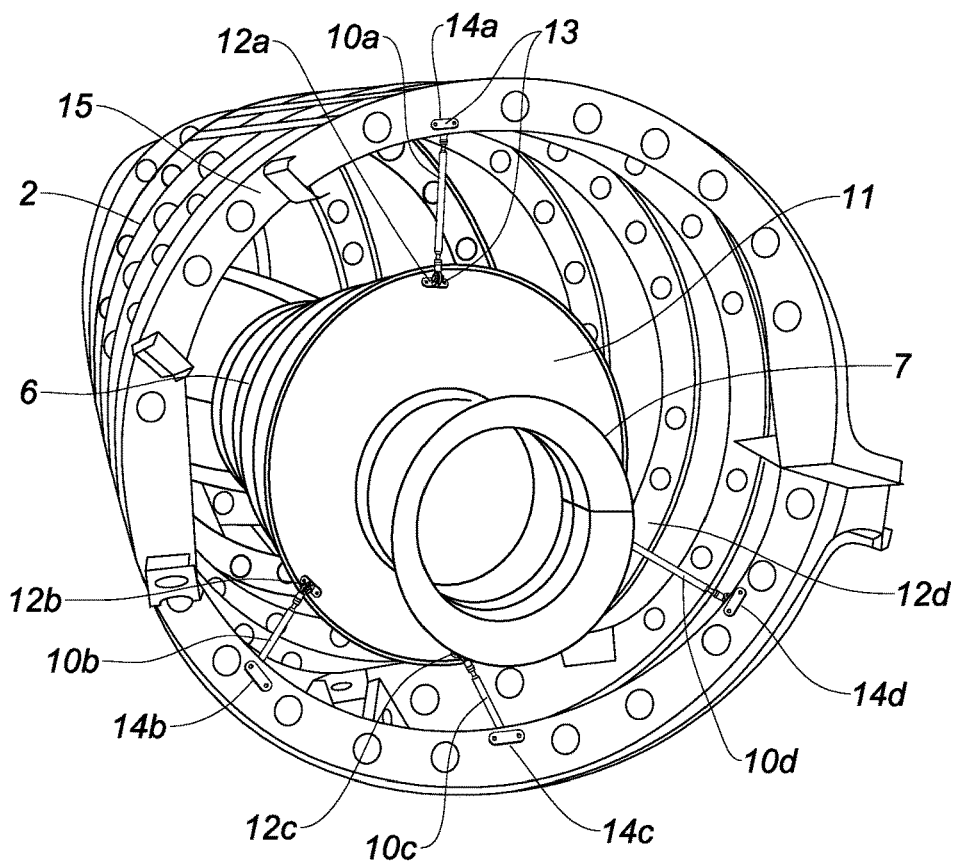
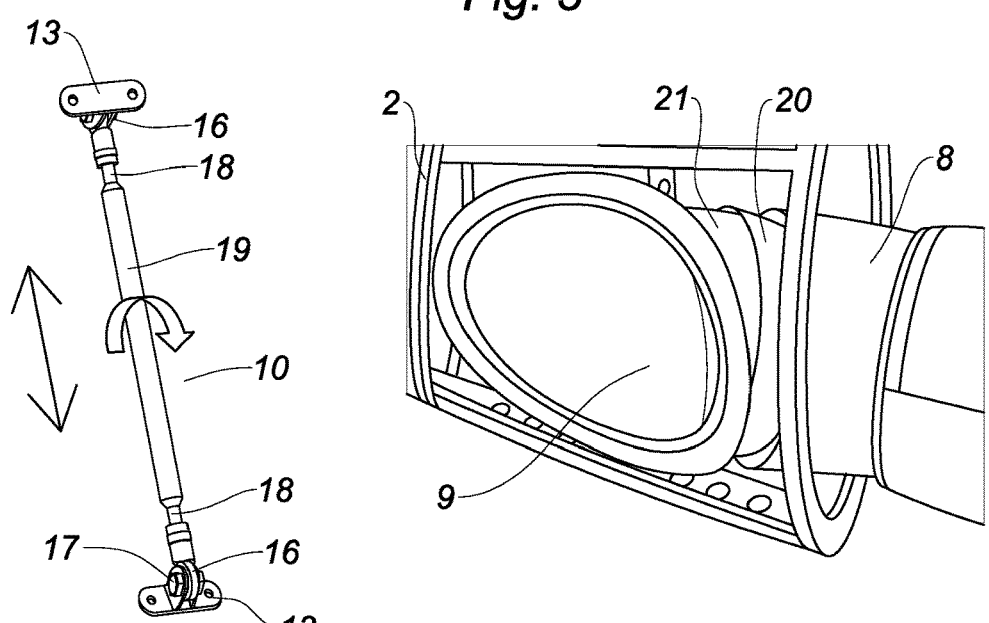
Fig. 3
Fig. 4
Fig. 5

SUSPENSION OF A TUBULAR ELEMENT IN AN AIRCRAFT COMPARTMENT

FIELD OF THE INVENTION

The present invention relates to the field of the suspension of engines, in particular in an aircraft. It relates more particularly to precisely positioning the engine within the aircraft in relation to equipment that has to cooperate with this engine in order to ensure correct operation.

PRIOR ART

In particular, the invention relates to an auxiliary power unit (APU). An APU may provide power to equipment (alternators, pumps, load compressors, air conditioning) of the aircraft, directly and/or indirectly via a power transfer box, in particular during transitional flight phases.

As with any turboshaft engine, an APU conventionally comprises a compressor/combustion chamber/turbine assembly forming a gas generator. Fresh air is introduced into the compressor and then the compressed air, mixed with fuel, causes combustion in the dedicated chamber. The hot gases are expanded in the turbine, which transmits part of the mechanical power supplied to the compressor via a transmission shaft, the residual power being directed to the equipment via a power transfer box. In another type of architecture, the kinetic power of the exhaust gases may also drive a free turbine which, in turn, transmits power via a shaft to the equipment (alternators, pumps, load compressor, etc.). The residual gases are then discharged via an exhaust nozzle.

The APU in general forms a module which integrates the turboshaft engine with various accessories, such as a power transfer box and a lubrication system, and is installed in a dedicated compartment. In civilian aircraft, the auxiliary power unit is for example conventionally mounted inside the tail cone and fastened upstream to a fuselage partition that is involved in structurally supporting the aircraft.

Installing the APU in its compartment involves, in particular, a pipe having a first function of allowing the gases to escape from the turboshaft engine to the outside of the aircraft. Moreover, the presence of this pipe may be used to ensure the ventilation and cooling of the APU and its accessories, as explained in the application FR2969123.

To this end, the mouth of the exhaust pipe is flared and is suitable for receiving the outlet nozzle of the turboshaft engine while providing a gap therebetween. This gap makes it possible to draw the air from the compartment using the Venturi effect, and therefore to produce a secondary air flow that cools the APU compartment, and in particular its equipment and external parts. It is important to maintain the shape of this gap between the outlet of the turboshaft engine and the exhaust pipe in order to ensure cooling. The position of the exhaust pipe is therefore generally adjusted relative to the APU.

Generally, in addition, the exhaust nozzle of the turboshaft engine is positioned at the rear of the APU and the exhaust pipe guides the gases towards an opening in the wall of the tail cone that is positioned a little further back. This arrangement means that the APU, the pipe and the wall of the tail cone have to be positioned at points that are distributed in the extension direction of the tail cone, along the axis of the fuselage.

Moreover, the suspension device for the APU in the tail cone, for example, generally comprises four linkages attaching the front of the APU to the fuselage partition, and two attaching the APU to the structure of the tail cone. It thus leaves the rear of the APU, which comprises the nozzle outlet, clear in order to adapt the exhaust to fit into a generally reduced space in this region of the compartment.

In this configuration, with the partition at the front of the tail cone setting a reference, the manufacturing tolerances of the various elements may result in significant differences in relative position between the nozzle of the APU and the mouth of the exhaust and/or between the rear end of the pipe and the opening in the tail cone into which it has to lead. These differences may be due to the devices for supporting the APU. However, they may also be due to the structure of the tail cone, slight warping of which, for example, may significantly displace the position of the opening when the APU is correctly aligned relative the axis of the fuselage.

Manufacturing parts with sufficient precision to align all the elements proves to be complex and expensive.

An existing solution which involves fastening the upstream part of the pipe in the tail cone by means of plates having slots made therein that allow the position in which they are bolted to the structure to be adjusted proves unsatisfactory. First, it does not always allow the mouth of the pipe to be aligned with the outlet of the nozzle without the other end of the pipe resting on the edges of the opening in the tail cone into which it has to lead. This type of situation produces stresses on the assembly which may lead to premature wear to the different elements, in particular to the fire-protection seal that is installed in the opening. Second, these plates make the assembly heavier.

The problem set out above may also be found in other situations. The object of the invention is to provide a solution for correctly aligning the assembly of an engine module, in particular an APU, an accessory module and a part of the structure of the compartment containing them, without requiring excessive manufacturing precision. A second object of the invention is to make it possible to save weight by simplifying the device for attaching the APU and its accessories while reducing the stresses on the structural part containing them.

SUMMARY OF THE INVENTION

The invention relates to an assembly comprising a structure and a tubular element, which is mounted isostatically in the structure, said tubular element comprising a first end connected to said structure by at least four connecting rods, thus setting four first degrees of freedom, and a second end connected to said structure by an attachment means that sets two second degrees of freedom, said connecting rods comprising a means for adjusting the length thereof.

The connecting rods may comprise a double thread designed to translate the ends thereof in opposite directions, which makes it possible to adjust the length of the connecting rod at the point of installation in order to connect the tubular element to the structure, the tubular element also being temporarily held in the correct position.

Using connecting rods that are connected to the first end of the tubular element allows this end to be easily and precisely positioned. In particular, this tubular element may be the exhaust pipe of the turboshaft engine. When the mouth of the pipe needs to be adapted to fit around the outlet of the nozzle of the turboshaft engine with precise tolerances, it is possible to adjust the four connecting rods once the mouth of the pipe is correctly positioned. Moreover, the fact that the mounting is isostatic makes it possible to use the two degrees of freedom in order to position the other end of the exhaust pipe relative to the structure. It is indeed advantageous to place the attachment means corresponding to the two last degrees of freedom at the point corresponding to the second positioning constraint that the tubular element has to adhere to.

In particular, when it is a question of placing the APU module and the exhaust pipe in the compartment while ensuring the Venturi effect at the interface between the nozzle of the APU and the mouth of the pipe, this device makes it possible to correct a misalignment between the APU and the structure without interfering with the suspension of the APU. The exhaust pipe may be placed in front of the nozzle by means of the four connecting and adapted to fit the opening in the wall by the linkages at its rear end at the same time.

In addition, mounting using connecting rods is lighter than mounting using adjustable fittings between the exhaust pipe and the wall of the compartment of the APU.

The structure may in particular comprise a wall comprising an opening, the second end of the tubular element thus being slidingly mounted in this opening.

This corresponds to one of the remaining degrees of freedom. Advantageously, mounting this end of the tubular element also makes it possible to ensure that there is a ball-joint connection to the opening in the wall. This mounting is suited in particular to the exhaust of an APU. In terms of function, the pipe has to allow the gases to be discharged from the compartment and not to be forced against the wall. It is therefore important that the pipe is centred on the opening, by means of an interface ensuring radial pressure and allowing a ball-joint-type connection to be retained, and also allowing the translation along the axis of the opening to be retained. The pipe may therefore slightly slide or turn relative to the opening.

Preferably, the sliding mounting between the opening in the wall and the second end of the tubular element is flexible in accordance with at least one of the two degrees of freedom that it controls. This makes it possible to accept, in the region of the linkage between the tubular element and the opening in the wall, slight differences compared with the two degrees of freedom that are theoretically blocked by the linkage. This is the case, for example, when the tubular element expands under the effect of the hot exhaust gases, or when loads linked to the operation of the aircraft are applied to the tubular element and produce a slight displacement.

The invention also relates to an aircraft comprising an assembly as described above and an auxiliary power unit comprising a gas exhaust nozzle, the wall of the structure forming at least part of the wall of the compartment containing the auxiliary power unit and the tubular element being a pipe of which the inlet is positioned to collect the exhaust gases leaving the nozzle. Advantageously, the first device for attaching said pipe is designed such that the outlet of the nozzle of the APU fits into the first end of the pipe, while leaving play relative to said pipe over the entirety of its periphery. Said structure comprising the wall and the opening may form the tail cone.

The invention also relates to an installation comprising an assembly as described above and an engine module comprising a gas exhaust nozzle, the tubular element being a pipe of which the inlet is positioned to collect the exhaust gases leaving the nozzle. Preferably, the outlet of the nozzle fits into the first end of the pipe, while leaving play relative to said pipe over the entirety of its periphery.

In particular, the engine module comprises an auxiliary power unit, the wall of the structure forming at least part of the wall of the compartment containing the auxiliary power unit. This is the case in particular for an aircraft in which said structure forms the tail cone.

The invention also relates to a method for mounting a tubular element in a structure so as to position a first end of said tubular element while keeping a second end in contact with said structure, wherein, after having previously connected said second end to said structure by two degrees of freedom and having positioned said first end, said first end is connected to said structure by four connecting rods of which the length is adjusted so as to maintain this position. In particular, the method can be used when it is a question of positioning a first end of said tubular element relative to the engine module while keeping a second end of said tubular element in contact with said structure, said first end being positioned relative to the engine module that has been previously mounted in said structure.

BRIEF DESCRIPTION OF THE DRAWINGS

The present invention will be better understood, and other details, features and advantages of the invention will become clearer upon reading the following description of a non-limiting example with reference to the accompanying drawings, in which:

FIG. 3 is a perspective front view of a tubular element that is fastened in the structure according to the invention.

FIG. 4 shows an adjustable connecting rod implementing an aspect of the invention.

FIG. 5 is a perspective view of the connection between the rear end of the tubular element and the structure, according to another aspect of the invention.

DETAILED DESCRIPTION OF THE INVENTION

Figure 1:
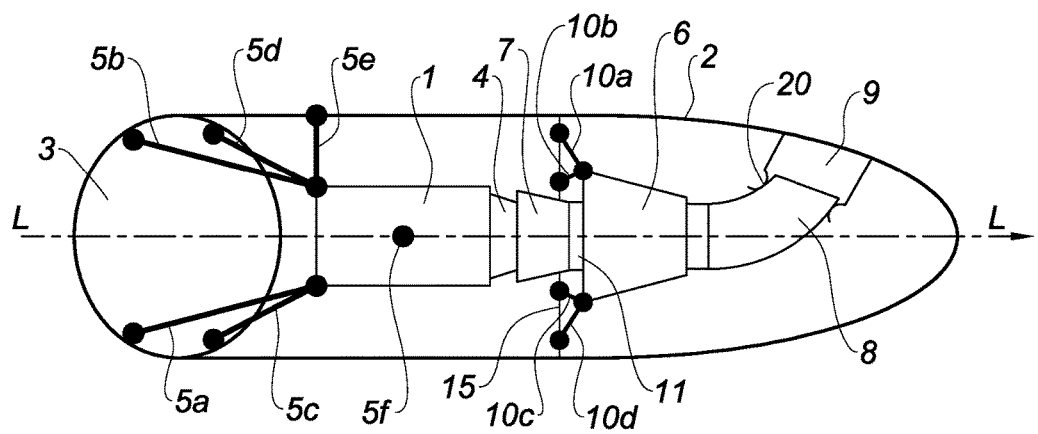
FIG. 1 is a plan view of a diagram of an installation according to the invention for a nominal situation.
Figure 2:
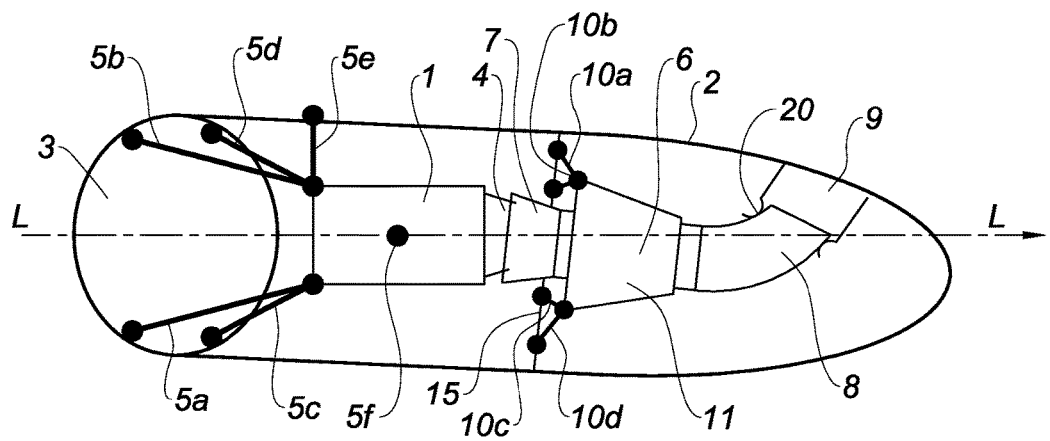
FIG. 2 is a plan view of a diagram of an installation according to the invention for a situation different from that in FIG. 1.

With reference to FIGS. 1 and 2, the invention relates for example to the installation of an APU engine module 1 in an aircraft compartment that has an elongate shape along a given axis LL and is delimited and at one end along the axis by a shell 2 and closed at the other end by a partition 3 through which this axis passes. The partition 3 and the shell 2 form the structure of the compartment to which equipment can be connected.

In the case of an APU module installed in a tail cone of an aircraft, for example, the axis LL corresponds to the axis LL of the fuselage that is oriented towards the rear, the partition 3 may be a structural partition of the fuselage, and the shell 2 may comprise the walls of the fuselage downstream of the partition 3 together with the structural elements which support said walls.

Since, in general, the axis LL is oriented from the front to the rear (from left to right in FIG. 1) and this of course corresponds to the flow direction, for convenience, reference is made in the rest of the description to the front and the rear in accordance with the directions of the axis LL indicated in FIG. 1. The APU engine module 1 and the shell 2 are both located at the rear of the partition 3. The direction along this axis LL towards the rear is therefore referred to as the offset direction in the rest of the description.

The APU module 1, which is shown highly schematically in FIG. 1, forms a module which integrates different equipment of the turboshaft engine and which, in particular, comprises on the rear face thereof a nozzle 4 for the outlet of the gases from the turboshaft engine.

The APU module is generally suspended from the structure in an isostatic manner by six connecting rods, 5a to 5f, which ensure its positioning according to the six degrees of freedom relative to the compartment. Although this is not obligatory, the six connecting rods supporting the engine module may be arranged such that four connecting rods 5a-5b-5c-5d are attached to the structural partition 3 and two connecting rods 5e-5f are attached to the shell 2.

An exhaust pipe 6 collects these exhaust gases by means of a mouth 7, at the front of the pipe, which covers the outlet nozzle 4 of the turboshaft engine in part. As shown in FIG. 1, this mouth 7 is flared, and is larger than the nozzle 4. Ideally, the nozzle 4 and the mouth 7 are concentric and the difference in diameter produces an annular space that is large enough to draw in air from the compartment. In practice, the two elements may not be perfectly aligned, but they need to leave a passage over the entire periphery of the nozzle, the width of which passage has to remain between a minimum value and a maximum value. The pipe 6 then discharges the gases into the air outside the compartment. To do this, the rear end 8 thereof leads into an opening 9 in the shell 2.

According to a first aspect of the invention, the exhaust pipe 6 is supported in the region of its mouth by four connecting rods 10a-10b-10c-10d. As shown in FIG. 3, the connecting rods may be fastened to a section 11 of the exhaust pipe 6 that is close to the front end and corresponds to a larger part of the exhaust pipe to which the mouth 7 is fastened. This arrangement makes it possible to prevent the problems relating to the mechanical strength of the pipe and to the geometric definition of the mouth 7 in order to adapt it to fit the tube 4.

Moreover, the connecting rods 10a-10b-10c-10d are fastened at their attachment points 12a-12b-12c-12d to the section 11 by fittings 13 containing ball joints, as shown in FIG. 3. These attachment points 12a-12b-12c-12d are distributed over the periphery of the section 11 so as to control the four last degrees of freedom of the exhaust pipe 6.

The other ends of the connecting rods 10a-10b-10c-10d are also fastened to the shell 2 by fittings 13 containing ball joints. The attachment points 14a-14b-14c-14d of the connecting rods 10a-10b-10c-10d to the shell 2 are distributed over the circumference of the wall and are substantially positioned opposite the respective attachment points 12a-12b-12c-12d to the exhaust pipe 6. As shown in FIG. 3, although this is not obligatory, these attachment points 14a-14b-14c-14d are preferably installed on a structural frame 15 of the shell 2.

The connecting rods that are thus installed provide a lightweight solution to controlling four degrees of freedom of the exhaust pipe in the vicinity of its mouth.

According to a second aspect of the invention, the length of these connecting rods can be adjusted. In the embodiment shown in FIG. 4, at each end of the connecting rod 10, a clevis 16 intended to surround the sphere 17 that is rigidly connected to the attachment fitting 13 is extended by a rod 18, the end of which is threaded. The body 19 of the connecting rod 10 comprises, at the corresponding end, a hollow thread designed to engage with the threaded rod 18 of the clevis 16. In this way, the length of the connecting rod 10 may be adjusted by screwing or unscrewing the body 19 of the connecting rod 10 about the threaded rod 18 of each clevis 16, or of one of them, as shown by the arrows in FIG. 4. When the length is adjusted, the movement of the rod 18 relative to the body 19 of the connecting rod 10 can be blocked in a reversible manner, using a locking nut for example. It is also possible to bond the two parts, but the bonding thus has to be destroyed if the length needs to be modified again.

In particular, this system makes it possible to install the clevises 18 of the connecting rod 10 in the fittings 13 that are intended to be fastened to the exhaust pipe 6 at one end and to the shell 2 at the other in advance. The length of the connecting rod 10 can be varied without disengaging the clevis 18 from the fitting 13.

By using these adjustable connecting rods, it is therefore possible to rapidly adjust their length such that the fittings 13 can be fastened to the corresponding attachment points on the exhaust pipe 6 and on the shell 2 in order to change the position of the pipe. It is also possible to use connecting rods that are close to the theoretical length and to adjust them in situ during mounting, without having to adhere to extremely precise dimensions when they are being manufactured.

According to another aspect of the invention, the opening 9 is equipped with a device 20 for supporting the rear end 8 of the pipe 6 which allows the pipe 6 to slide and ensure a ball-joint-type connection relative to the opening 9.

One embodiment of this support device is shown in FIG. 5. In this example, the opening 9 discharges the gases laterally. It is equipped with an elbow fitting 21 that is rigidly connected to the shell 2 at the outlet and is joined longitudinally to the rear end 8 of the exhaust pipe 6. The attachment device 20 is formed by flexible strips that form the joint between the rear end of the exhaust pipe 6 and the inlet of the elbow fitting 21.

In this way, the attachment device 20 blocks two degrees of freedom of the exhaust pipe 6 corresponding to the translation of its rear end 8 in the two directions transverse to the longitudinal direction LL, while allow sliding in this longitudinal direction and ensuring a ball-joint-type connection.

The device that suspends the exhaust pipe 6 relative to the shell 2 formed by the four connecting rods 10a-10b-10c-10d fastened to the section 11 close to the front end 7 and that suspends the means 20 for supporting the rear end 8 close to the opening 9 is therefore isostatic. It allows the position of the mouth 7 of the exhaust pipe 6 to be controlled while keeping its downstream end 8 centred on the opening 9 for discharging the gases.

Moreover, the support means 20 on the opening may have a resilience allowing it to maintain the contact with the exhaust pipe 6 in the vicinity of its rear end 8 despite small movements relative to the theoretical position in the two transverse directions. It may also integrate a fire-protection function by preventing communication between the inside of the compartment of the APU and the outside.

With reference to FIG. 1, in a nominal configuration, the shell 2 is aligned along the axis LL relative to the partition 3 and the device for suspending the APU module 1 is designed such that the APU module 1 is perfectly aligned along the same axis LL. Moreover, the front of the exhaust pipe 6 has been fastened such that its mouth 7 is centred relative to the shell 2. Under these conditions, the mouth 7 surrounds the outlet of the nozzle 4, leaving the space required to produce the Venturi effect. Moreover, the rear end 8 of the exhaust is correctly centred in the opening 9 and retained without excessive force by the attachment means 20.

However, as already mentioned, the cumulative effect of manufacturing tolerances on the connecting rods, the APU module 1 or the shell 2, in particular with regard to their linkages to the rest of the structure of the aircraft to which the structural partition 3 is rigidly connected, may lead to misalignments. In the example in FIG. 2, the misalignment is essentially due to manufacturing variations in the shell 2 or due to its attachment to the structural partition 3, which is why this shell is off-centre relative to the direction LL perpendicular to the partition. However, the invention may be applicable to other cases, for example if the manufacturing variations in the APU module and/or the connecting rods lead, by contrast, to the module being off-centre relative to the direction LL. It may also be the case that the two causes occur simultaneously. In all cases, recentring the exhaust pipe 6 as proposed in the present invention allows the outlet of the nozzle 4 to be correctly positioned in the mouth 7 of the exhaust pipe 6.

With reference to FIG. 2, according to an embodiment of the invention, the APU module 1 having a defined position that does not correspond to the position of the mouth 7 of the exhaust pipe 6 when it is centred, the arrangement of the connecting rods 10a-10b-10c-10d is adjusted, while keeping the exhaust pipe 6 in the region of the mouth 7, in order to position said mouth around the nozzle 4.

An example of the method for mounting the assembly formed by the APU module 1 and its exhaust pipe 6 in the compartment in a simple manner comprises the steps described below. This example is described for the case in which the APU module 1 is mounted in the compartment from below by guiding it vertically into its support.

In a preliminary step, the APU module 1 and the exhaust pipe 6 were manufactured in order to be joined together in the compartment that is intended to receive the APU, with the theoretical dimensions of the partition 3 and the shell 2.

In a first step, the exhaust pipe 6 is installed in the shell 2 by connecting its rear end 8 using the attachment means 20. Moreover, its front end 7 is supported by temporary means in a position which, in this case, is slightly above the theoretical position that it needs to occupy. In addition, the lower half of the mouth 7 of the exhaust pipe 6 will have been removed, in order to allow the nozzle 4 to pass through the APU module 1 when it is installed on the suspension device.

In a second step, the APU module 1 is mounted using the device 5a-5b-5c-5d-5e-5f for suspending said module from the partition 3 and the shell 2 which was previously specified when the assembly was designed. In order to carry out this step, it is possible to have previously removed the lower half of the mouth 7 of the exhaust pipe 6 in order to allow the nozzle 4 to pass through the APU module 1 when it is installed on the suspension device.

In a third step, the position of the mouth 7 is adjusted around the nozzle 4. For this purpose, one or more wedges may be installed over the periphery of the nozzle 4, allowing the play that the nozzle 4 and the mouth 7 need to provide to be simulated in a simple manner. It is therefore ensured that the exhaust pipe 6 is positioned such that the necessary play is provided between the nozzle 4 and the mouth 7 when said mouth is placed against the outer wall of the nozzle by pressing on the wedges. The ball-joint-type connection between the rear end 8 of the exhaust 6 and the attachment means 20 allows this adjustment to take place without exerting any pressure on the exhaust 8 or the attachment means 20.

In a fourth step, the four connecting rods 10a-10b-10c-10d are fastened, according to the arrangement that has already been described with reference to FIG. 3, at their provided attachment points 12a-12b-12c-12d on the section 11 of the exhaust pipe 6 and at their provided attachment points 14a-14b-14c-14d on the shell 2, so as to support the exhaust pipe in the position reached in the previous step.

In order achieve this result, the use of adjustable connecting rods 10 corresponding to FIG. 4 allows the length thereof to be adjusted until the fittings 13 attached to the clevises 16 thereof come into alignment with the bolting means provided on the attachment points 12a-12b-12c-12d of the exhaust pipe 6 and on the attachment points 14a-14b-14c-14d of the shell 2.

In a final step, the mounting is completed by removing the wedge(s) which simulated the play between the nozzle 4 and the mouth 7 of the exhaust pipe 6.

It should be noted that if the APU or the exhaust were to be subsequently removed/remounted, no further adjustments would be necessary.

The implementation of the invention has been described in detail for the case of an exhaust for an APU installed in a compartment. However, the applicant does not intend to restrict the invention to this specific case. A person skilled in the art can easily adapt the invention to any tubular element of which one end needs to be positioned while ensuring that its other end is centred in an element of its support.

The invention claimed is:

1. An installation comprising an engine module comprising a gas exhaust nozzle and an assembly comprising a structure and an exhaust pipe of a turboshaft engine, which is mounted isostatically in the structure, said exhaust pipe comprising a first end connected to said structure by at least four connecting rods, thus setting four first degrees of freedom, and a second end connected to said structure by an attachment means that sets two second degrees of freedom, said connecting rods comprising a means for adjusting the length thereof, the exhaust pipe being a pipe of which an inlet is positioned to collect the exhaust gases leaving the gas exhaust nozzle, and wherein an outlet of the gas exhaust nozzle fits into the first end of the exhaust pipe, while leaving play relative to said exhaust pipe over the entirety of the periphery of said exhaust pipe.

2. The installation according to claim 1, wherein the structure comprises a wall comprising an opening, the second end of the exhaust pipe being slidingly mounted in said opening.

3. The installation according to claim 2, wherein the sliding mounting between the wall and the second end of the exhaust pipe is flexible in accordance with at least one of the two second degrees of freedom.

4. The installation according to claim 1, wherein the engine module comprises an auxiliary power unit, the wall of the structure forming at least part of the wall of the compartment containing the auxiliary power unit.

5. An aircraft comprising the installation according to claim 4, wherein said structure forms the tail cone.

6. A method for mounting an engine module comprising a gas exhaust nozzle and an exhaust pipe of a turboshaft engine in a structure so as to position a first end of said exhaust pipe relative to the engine module while keeping a second end of said exhaust pipe in contact with said structure, wherein, after having previously connected said second end to said structure by two degrees of freedom and having positioned said first end so that an outlet of the gas exhaust nozzle fits into the first end of the exhaust pipe, while leaving play relative to said exhaust pipe over the entirety of the periphery of said exhaust pipe, said first end is connected to said structure by four connecting rods of which the length is adjusted so as to maintain this position, said first end being positioned relative to the engine module that has been previously mounted in said structure.

* * * * *